(12) United States Patent
Kang et al.

(10) Patent No.: US 10,446,864 B2
(45) Date of Patent: Oct. 15, 2019

(54) POLYMER AND POLYMER ELECTROLYTE MEMBRANE COMPRISING SAME

(71) Applicant: LG CHEM, LTD., Seoul (KR)

(72) Inventors: Esder Kang, Daejeon (KR); Joong Jin Han, Daejeon (KR); Youngjea Kim, Daejeon (KR); Yong Jin Jang, Daejeon (KR); Yunah Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 156 days.

(21) Appl. No.: 15/531,670

(22) PCT Filed: Dec. 4, 2015

(86) PCT No.: PCT/KR2015/013218
§ 371 (c)(1),
(2) Date: May 30, 2017

(87) PCT Pub. No.: WO2016/089158
PCT Pub. Date: Jun. 9, 2016

(65) Prior Publication Data
US 2017/0338504 A1      Nov. 23, 2017

(30) Foreign Application Priority Data

Dec. 4, 2014   (KR) .................. 10-2014-0173137
Dec. 4, 2014   (KR) .................. 10-2014-0173142
(Continued)

(51) Int. Cl.
*H01M 8/1023*   (2016.01)
*H01M 8/18*     (2006.01)
(Continued)

(52) U.S. Cl.
CPC ............ *H01M 8/1032* (2013.01); *B01J 39/19* (2017.01); *B01J 47/12* (2013.01); *C08G 61/02* (2013.01);
(Continued)

(58) Field of Classification Search
CPC .... H01M 8/18; H01M 8/1023; H01M 8/1032; C08F 28/00; C08F 28/04
See application file for complete search history.

(56) References Cited

U.S. PATENT DOCUMENTS 7,807,759 B2   10/2010   Shin et al.
9,136,551 B2    9/2015   Kwon et al.
(Continued)

FOREIGN PATENT DOCUMENTS

EP   2270104 A1      1/2011
JP   2003-234014 A   8/2003
(Continued)

OTHER PUBLICATIONS

Extended European Search Report dated Mar. 28, 2018 for Application No. 15865281.8.
(Continued)

*Primary Examiner* — Kenneth J Douyette
(74) *Attorney, Agent, or Firm* — Birch, Stewart, Kolasch & Birch, LLP

(57) ABSTRACT

The present specification relates to a polymer with improved ion transport capability, a polymer electrolyte membrane including the same, a membrane-electrode assembly including the polymer electrolyte membrane, a fuel cell including the membrane-electrode assembly, and a redox flow battery including the polymer electrolyte membrane.

20 Claims, 2 Drawing Sheets

(30) Foreign Application Priority Data

Dec. 4, 2014 (KR) .................. 10-2014-0173157
Dec. 4, 2014 (KR) .................. 10-2014-0173178

(51) Int. Cl.

| | |
|---|---|
| C08F 28/04 | (2006.01) |
| C08G 75/20 | (2016.01) |
| H01M 8/1032 | (2016.01) |
| H01M 8/1004 | (2016.01) |
| H01M 8/1027 | (2016.01) |
| H01B 1/12 | (2006.01) |
| C08J 5/22 | (2006.01) |
| C08G 61/02 | (2006.01) |
| C08G 61/12 | (2006.01) |
| C08L 65/00 | (2006.01) |
| C08G 81/00 | (2006.01) |
| C08G 75/02 | (2016.01) |
| B01J 39/19 | (2017.01) |
| B01J 47/12 | (2017.01) |
| C08G 65/40 | (2006.01) |
| H01M 8/1025 | (2016.01) |
| H01M 8/1039 | (2016.01) |
| H01M 8/1053 | (2016.01) |
| H01M 8/1018 | (2016.01) |

(52) U.S. Cl.

CPC ......... *C08G 61/12* (2013.01); *C08G 65/4056* (2013.01); *C08G 75/02* (2013.01); *C08G 75/20* (2013.01); *C08G 81/00* (2013.01); *C08J 5/22* (2013.01); *C08J 5/2262* (2013.01); *C08L 65/00* (2013.01); *H01B 1/128* (2013.01); *H01M 8/1004* (2013.01); *H01M 8/1023* (2013.01); *H01M 8/1025* (2013.01); *H01M 8/1027* (2013.01); *H01M 8/1039* (2013.01); *H01M 8/1053* (2013.01); *H01M 8/188* (2013.01); *C08G 2650/40* (2013.01); *C08G 2650/48* (2013.01); *C08G 2650/64* (2013.01); *C08J 2371/10* (2013.01); *H01M 2008/1095* (2013.01); *H01M 2300/0082* (2013.01); *Y02E 60/528* (2013.01)

(56) References Cited

U.S. PATENT DOCUMENTS

| | | | |
|---|---|---|---|
| 9,912,002 B2 | 3/2018 | Kong | |
| 2004/0048129 A1* | 3/2004 | Taft, III | B01D 67/0079 521/27 |
| 2005/0031924 A1 | 2/2005 | Shirono et al. | |
| 2005/0053818 A1 | 3/2005 | St-Arnaud et al. | |
| 2006/0188768 A1 | 8/2006 | Kanaoka et al. | |
| 2008/0114149 A1 | 5/2008 | Moore et al. | |
| 2008/0114183 A1 | 5/2008 | Moore et al. | |
| 2009/0123641 A1* | 5/2009 | Hadj Romdhane | B01D 67/0009 427/58 |
| 2009/0163692 A1 | 6/2009 | Moore et al. | |
| 2009/0169950 A1 | 7/2009 | Prugh et al. | |
| 2010/0167100 A1 | 7/2010 | Moore et al. | |
| 2011/0020731 A1 | 1/2011 | Yoshimura et al. | |
| 2011/0059385 A1 | 3/2011 | Kim et al. | |
| 2011/0136040 A1 | 6/2011 | Hwang et al. | |
| 2012/0028138 A1 | 2/2012 | Lee et al. | |
| 2012/0052347 A1* | 3/2012 | Wilson | H01M 8/0232 429/72 |
| 2012/0135333 A1 | 5/2012 | Meredith, III et al. | |
| 2014/0030573 A1 | 1/2014 | Esswein et al. | |
| 2014/0065512 A1 | 3/2014 | Kwon et al. | |
| 2014/0227627 A1 | 8/2014 | He et al. | |
| 2016/0260994 A1 | 9/2016 | Kong | |
| 2016/0380297 A1 | 12/2016 | Kong et al. | |
| 2017/0338504 A1 | 11/2017 | Kang et al. | |

FOREIGN PATENT DOCUMENTS

| | | |
|---|---|---|
| JP | 2004-335231 A | 11/2004 |
| JP | 2006-228628 A | 8/2006 |
| JP | 2009-256654 A | 11/2009 |
| JP | 2011-57982 A | 3/2011 |
| JP | 2012-149259 A | 8/2012 |
| JP | 2013-218868 A | 10/2013 |
| KR | 10-2003-0076057 A | 9/2003 |
| KR | 10-2006-0071690 A | 6/2006 |
| KR | 10-2006-0100148 A | 9/2006 |
| KR | 10-2010-0076902 A | 7/2010 |
| KR | 10-2010-0084237 A | 7/2010 |
| KR | 10-2011-0063175 A | 6/2011 |
| KR | 10-2013-0062252 A | 6/2013 |
| KR | 10-2015-0048639 A | 5/2015 |
| WO | WO 2006/132144 A1 | 12/2006 |

OTHER PUBLICATIONS

Extended European Search Report dated Mar. 28, 2018 for Application No. 15866009.2.
Extended European Search Report dated Mar. 28, 2018 for Application No. 15866198.3.
European Search Report for Appl. No. 15865952.4 dated May 29, 2018.
U.S. Office Action for U.S. Appl. No. 15/531,702, dated Sep. 7, 2018.
Arvai et al., "New aryl-containing fluorinated sulfonic acids and their ammonium salts, useful as electrolytes for fuel cells or ionic liquids", Journal of Fluorine Chemistry, vol. 129, 2008, pp. 1029-1035.
International Search Report issued in PCT/KR2015/013202 (PCT/ISA/210), dated Apr. 6, 2016.
International Search Report issued in PCT/KR2015/013203 (PCT/ISA/210), dated Apr. 6, 2016.
International Search Report issued in PCT/KR2015/013206 (PCT/ISA/210), dated Apr. 7, 2016.
International Search Report issued in PCT/KR2015/013209 (PCT/ISA/210), dated Apr. 1, 2016.
International Search Report issued in PCT/KR2015/013213 (PCT/ISA/210), dated May 19, 2016.
International Search Report issued in PCT/KR2015/013218 (PCT/ISA/210), dated Apr. 8, 2016.
Paillard et al., "Electrochemical investigation of polymer electrolytes based on lithium 2-(phenylsulfanyl)-1,1,2,2-tetrafluoroethansulfonate", Electrochimica Acta, vol. 53, 2007, pp. 1439-1443.
Paillard et al., "Polymer electrolytes based on new aryl-containing lithium perfluorosulfonates", Journal of Fluorine Chemistry, vol. 134, 2012, pp. 72-76.
Toulgoat et al., "An Efficient Preparation of New Sulfonyl Fluorides and Lithium Sulfonates", The Journal of Organic Chemistry, vol. 72, No. 24, 2007, pp. 9046-9052.
Xu et al., "Highly Conductive Aromatic Ionomers with Perfluorosulfonic Acid Side Chains for Elevated Temperature Fuel Cells", Macromolecules, vol. 44, 2011, pp. 4605-4609.
U.S. Office Action dated Apr. 12, 2019 for U.S. Appl. No. 15/531,596.
U.S. Office Action for U.S. Appl. No. 15/531,584, dated Dec. 13, 2018.

\* cited by examiner

[Figure 1]
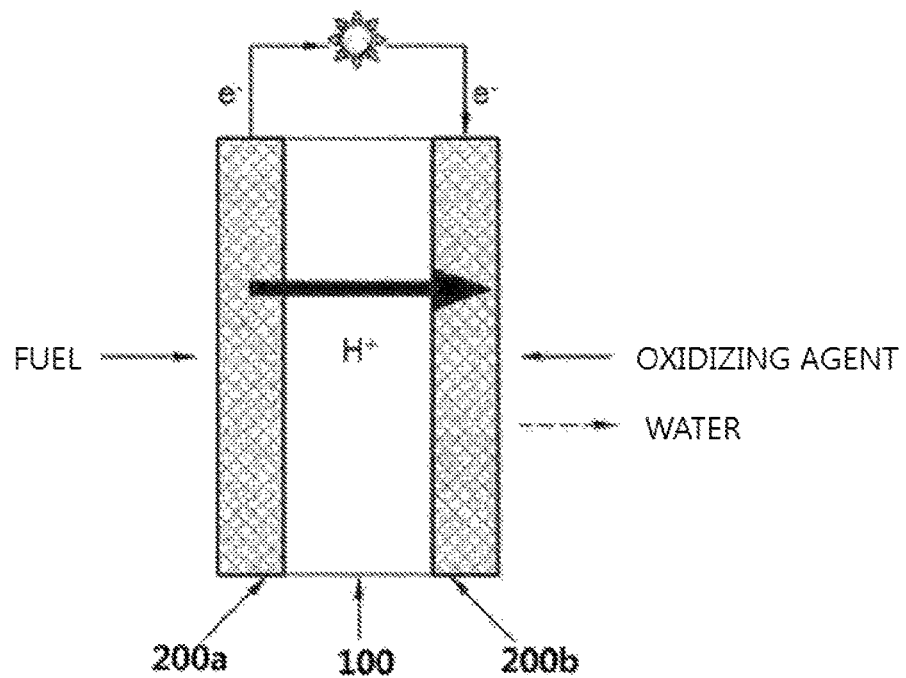
[Figure 2]
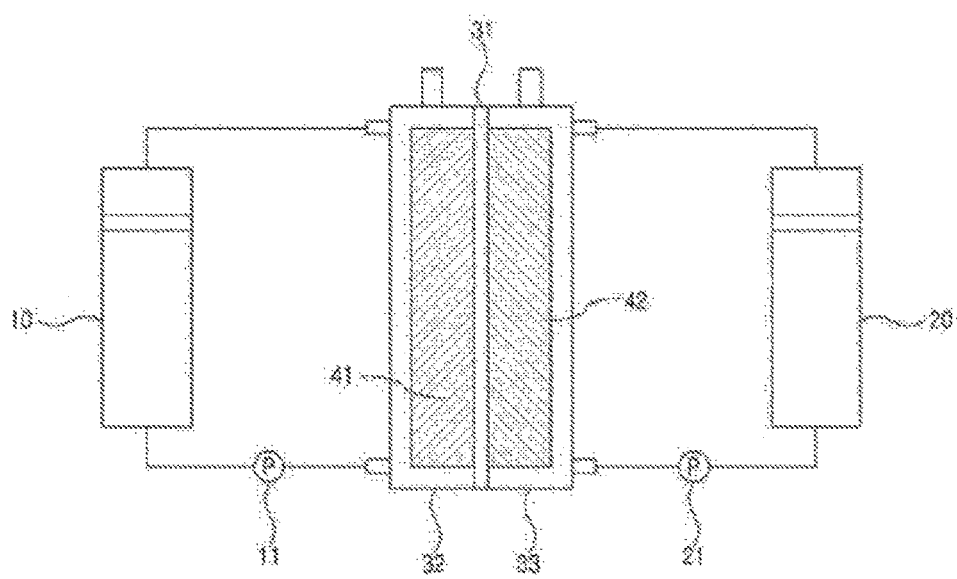

[Figure 3]
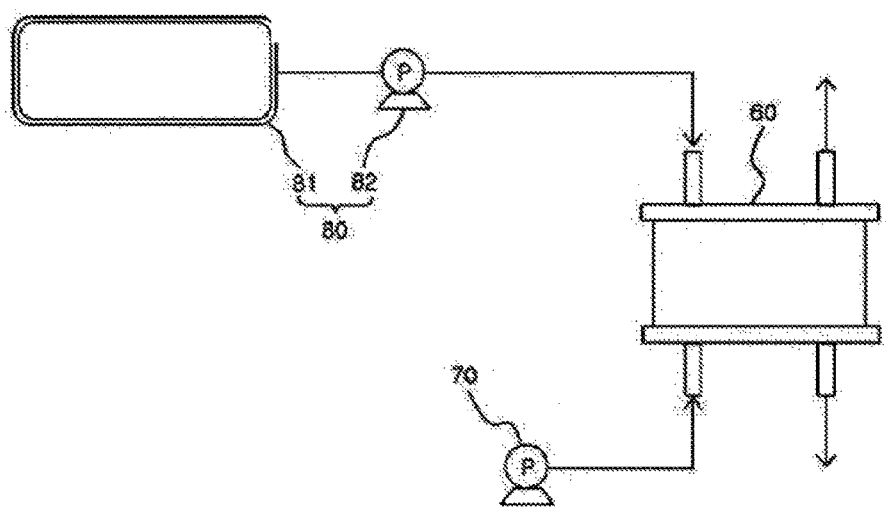

POLYMER AND POLYMER ELECTROLYTE MEMBRANE COMPRISING SAME

TECHNICAL FIELD

The present specification claims priority to and the benefit of Korean Patent Application Nos. 10-2014-0173157, 10-2014-0173178, 10-2014-0173137, and 10-2014-0173142 filed in the Korean Intellectual Property Office on Dec. 4, 2014, the entire contents of which are incorporated herein by reference.

The present specification relates to a polymer and a polymer electrolyte membrane including the same.

BACKGROUND ART

A fuel cell is an energy conversion device that converts chemical energy of a fuel directly into electrical energy. That is, the fuel cell uses a fuel gas and an oxidizing agent, and adopts a method of producing electric power by using the electrons generated during the redox reaction of the fuel gas and the oxidizing agent. A membrane-electrode assembly (MEA) of the fuel cell is a part in which an electrochemical reaction of hydrogen and oxygen occurs, and is composed of a cathode, an anode, and an electrolyte membrane, that is, an ion conductive electrolyte membrane.

A redox flow battery (oxidation-reduction flow battery) is an electrochemical storage device that stores chemical energy of an active material directly into electrical energy by using a system in which the active material included in an electrolytic solution is oxidized and reduced and thus the battery is charged and discharged. A unit cell of the redox flow battery includes an electrode, an electrolyte, and an ion exchange membrane (electrolyte membrane).

Fuel cells and redox flow batteries have been researched and developed as a next-generation energy source due to high energy efficiency and eco-friendly characteristics producing less emission of contaminants.

The most essential constituent element of the fuel cells and the redox flow batteries is a polymer electrolyte membrane capable of exchanging cations, and the polymer electrolyte membrane may have characteristics of 1) excellent proton conductivity, 2) prevention of crossover of the electrolyte, 3) strong chemical resistance, 4) strengthening of mechanical properties and/or 4) a low swelling ratio. The polymer electrolyte membrane is classified into fluorine-based, partial fluorine-based, hydrocarbon-based, and the like, and the partial fluorine-based polymer electrolyte membrane has a fluorine-based main chain, and thus has advantages in that physical and chemical stabilities are excellent and thermal stability is high. Further, the partial fluorine-based polymer electrolyte membrane has advantages of both a hydrocarbon-based polymer electrolyte membrane and a fluorine-based polymer electrolyte membrane because a cation transport functional group is attached to the ends of a fluorine-based chain similarly to a fluorine-based polymer electrolyte membrane.

However, the partial fluorine-based polymer electrolyte membrane has a problem in that cation conductivity is relatively low because the micro phase separation of the cation transport functional group and the aggregation phenomenon are not effectively controlled. Accordingly, studies have been conducted toward securing high cation conductivity through the distribution of sulfonic acid groups and the control of the micro phase separation.

CITATION LIST

Patent Document

Korean Patent Application Laid-Open No. 10-2003-0076057

DETAILED DESCRIPTION OF THE INVENTION

Technical Problem

The present specification has been made in an effort to provide a polymer having improved ion transport capability and a polymer electrolyte membrane including the same.

Technical Solution

The present specification provides a polymer including: a first monomer represented by the following Chemical Formula 1; and a second monomer which is different from the first monomer and has at least one sulfonic acid group.

[Chemical Formula 1]

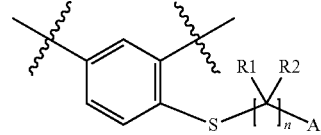

In Chemical Formula 1,

A is —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$, or —$O(CF_2)_mPO_3^{2-}2M^+$, m is an integer from 1 to 6, M is a Group 1 element, R1 and R2 are the same as or different from each other, and are each independently a halogen group, n is an integer from 1 to 10, and when m and n are 2 or more, two or more structures in the parenthesis are the same as or different from each other.

Further, the present specification provides a polymer electrolyte membrane including the polymer.

In addition, the present specification provides a reinforced membrane including: a substrate; and the polymer.

The present specification provides a membrane-electrode assembly including: an anode; a cathode; and the above-described polymer electrolyte membrane disposed between the anode and the cathode.

Further, the present specification provides a membrane-electrode assembly including: an anode; a cathode; and the above-described reinforced membrane disposed between the anode and the cathode.

The present specification provides a polymer electrolyte-type fuel cell including: the above-described two or more membrane-electrode assemblies; a stack which includes a bipolar plate disposed between the membrane-electrode assemblies; a fuel supplying part which supplies fuel to the stack; and an oxidizing agent supplying part which supplies an oxidizing agent to the stack.

Further, the present specification provides a redox flow battery including: a positive electrode cell including a positive electrode and a positive electrode electrolytic solution; a negative electrode cell including a negative electrode and a negative electrode electrolytic solution; and the above-described polymer electrolyte membrane disposed between the positive electrode cell and the negative electrode cell.

Finally, the present specification provides a redox flow battery including: a positive electrode cell including a positive electrode and a positive electrode electrolytic solution; a negative electrode cell including a negative electrode and a negative electrode electrolytic solution; and the above-described reinforced membrane disposed between the positive electrode cell and the negative electrode cell.

Advantageous Effects

A polymer electrolyte membrane including a polymer according to an exemplary embodiment of the present specification is advantageous in forming a hydrophilic channel.

Further, for the polymer electrolyte membrane, a hydrophilic channel is efficiently formed in the polymer electrolyte membrane by controlling the phase separation structure.

Furthermore, the polymer electrolyte membrane has excellent proton conductivity. Consequently, a high performance of a fuel cell and/or a redox flow battery including the same is brought about.

BRIEF DESCRIPTION OF DRAWINGS

FIG. 1 is a schematic view illustrating the electricity generation principle of a fuel cell.

FIG. 2 is a view schematically illustrating an example of a redox flow battery.

FIG. 3 is a view schematically illustrating an example of a fuel cell.

EXPLANATION OF REFERENCE NUMERALS AND SYMBOLS

100: Electrolyte membrane
200a: Anode
200b: Cathode
10, 20: Tank
11, 21: Pump
31: Electrolyte membrane
32: Positive electrode cell
33: Negative electrode cell
41: Positive electrode electrolytic solution
42: Negative electrode electrolytic solution
60: Stack
70: Oxidizing agent supplying part
80: Fuel supplying part
81: Fuel tank
82: Pump

BEST MODE

Hereinafter, the present specification will be described in more detail.

When one part "includes" one constituent element in the present specification, unless otherwise specifically described, this does not mean that another constituent element is excluded, but means that another constituent element may be further included.

An exemplary embodiment of the present specification provides a polymer including: the first monomer represented by Chemical Formula 1; and a second monomer which is different from the first monomer and has at least one sulfonic acid group.

In the present specification, the $-[CR1R2]_n-A$ structure and an S atom as a linker of the benzene ring in Chemical Formula 1 are used. In this case, due to the electron withdrawing character of $-[CR1R2]_n-A$ linked with the S atom, it is possible to provide a polymer which is easily formed and is stable.

In an exemplary embodiment of the present specification, R1 and R2 are the same as or different from each other, and are each independently a halogen group. Specifically, R1 and R2 may be each independently selected from the group consisting of F; Cl; Br; and I.

When a polymer including the first monomer represented by Chemical Formula 1 of the present specification is included in a polymer electrolyte membrane, if R1 and R2 of Chemical Formula 1 are a halogen group, electrons may be withdrawn well, so that the acidity of the A functional group is increased, and accordingly, there are advantages in that the movement of hydrogen ions may be facilitated and the structure of the polymer electrolyte membrane may become strong. Specifically, according to an exemplary embodiment of the present specification, when R1 and R2 are fluorine, the advantages may be maximized.

According to an exemplary embodiment of the present specification, R1 and R2, which are substituted with carbon adjacent to A in Chemical Formula 1, may serve to increase decationization.

In an exemplary embodiment of the present specification, by further including a second monomer which is different from the first monomer and has at least one sulfonic acid group, it is possible to increase the maximum ion exchange capacity (IEC) of a polymer and to expect an increase in ion conductivity. Accordingly, it is advantageous in forming a hydrophilic channel of a polymer electrolyte membrane including a polymer according to an exemplary embodiment of the present specification.

In an exemplary embodiment of the present specification, n is an integer from 2 to 10. In another exemplary embodiment of the present specification, n is an integer from 2 to 6.

The monomer represented by Chemical Formula 1 according to an exemplary embodiment of the present specification may adjust the number of n's. In this case, the monomer may adjust the length of the structure in the parenthesis to serve to facilitate the phase separation phenomenon of the polymer electrolyte membrane, and to facilitate the movement of hydrogen ions of the polymer electrolyte membrane.

In an exemplary embodiment of the present specification, n is 2.

In another exemplary embodiment, n is 3.
In still another exemplary embodiment, n is 4.
In yet another exemplary embodiment, n is 5.
In still yet another exemplary embodiment, n is 6.
In a further exemplary embodiment, n is 7.
In an exemplary embodiment of the present specification, n is 8.
In another exemplary embodiment, n is 9.
In an exemplary embodiment of the present specification, n is 10.

In an exemplary embodiment of the present specification, A is $-SO_3H$ or $-SO_3^-M^+$.

In another exemplary embodiment, A is $-SO_3H$.

As described above, when A in Chemical Formula 1 is —SO₃H or —SO₃⁻M⁺, a chemically stable polymer may be formed.

In an exemplary embodiment of the present specification, M is a Group 1 element.

In the present specification, the Group 1 element may be Li, Na, or K.

In an exemplary embodiment of the present specification, the monomer represented by Chemical Formula 1 is represented by any one of the following Chemical Formulae 1-1 to 1-9.

[Chemical Formula 1-1]

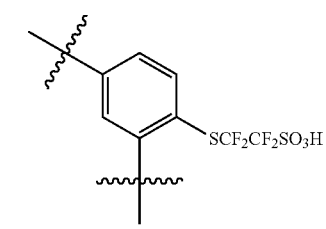

[Chemical Formula 1-2]

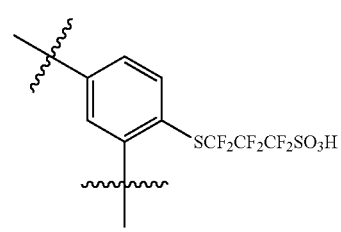

[Chemical Formula 1-3]

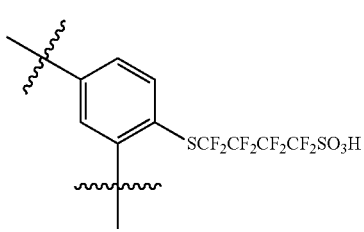

[Chemical Formula 1-4]

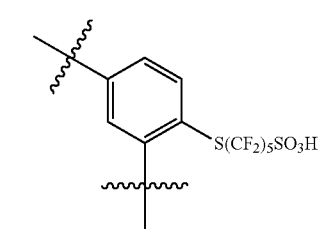

[Chemical Formula 1-5]

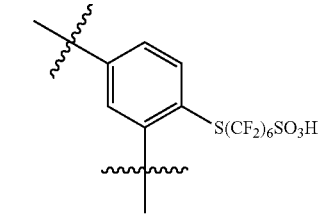

[Chemical Formula 1-6]

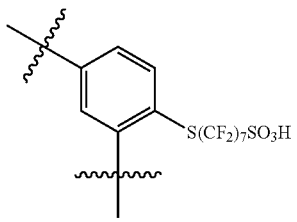

[Chemical Formula 1-7]

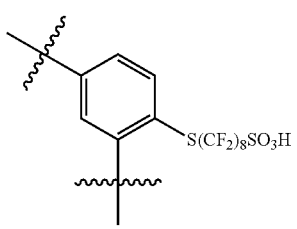

[Chemical Formula 1-8]

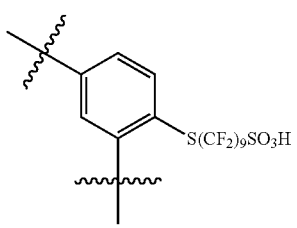

[Chemical Formula 1-9]

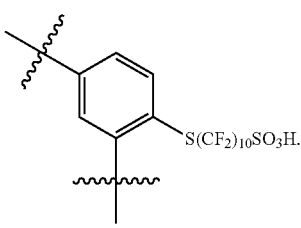

In an exemplary embodiment of the present specification, the second monomer is derived from a compound represented by the following Chemical Formula 2 or Chemical Formula 3.

[Chemical Formula 2]

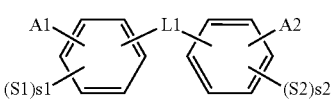

[Chemical Formula 3]

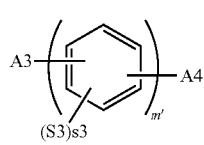

In Chemical Formulae 2 and 3,

A1 to A4 are the same as or different from each other, and are each independently a hydroxy group; or a halogen group, L1 is a direct bond; CR3R4; C=O; O; S; SO₂; SiR5R6; or a substituted or unsubstituted fluorenylene group, R3 to R6 are the same as or different from each other, and are each independently hydrogen; an alkyl group; fluorine; a haloalkyl group; or a phenyl group, S1 to S3 are the same as or different from each other, and are each independently hydrogen; deuterium; a halogen group; a cyano group; a nitrile group; a nitro group; a hydroxy group; a haloalkyl group; a sulfonic acid group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; or a substituted or unsubstituted heterocyclic group, s1, s2, and s3 are each an integer from 1 to 4, m' is an integer from 1 to 5, when s1, s2, s3, and m' are each an integer of 2 or more, two or more structures in the parenthesis are the same as or different from each other, and Chemical Formula 2 and Chemical Formula 3 are substituted with at least one sulfonic acid group.

In an exemplary embodiment of the present specification, A1 is a hydroxy group.

In another exemplary embodiment, A1 is a halogen group.

In an exemplary embodiment of the present specification, A2 is a hydroxy group.

In another exemplary embodiment, A2 is a halogen group.

In an exemplary embodiment of the present specification, L1 is $SO_2$.

In an exemplary embodiment of the present specification, the second monomer is derived from a compound represented by any one of the following Chemical Formulae 2-1 to 2-4, 3-1, and 3-2.

[Chemical Formula 2-1]
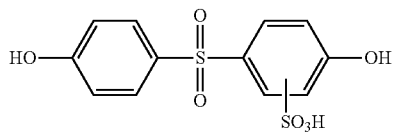

[Chemical Formula 2-2]
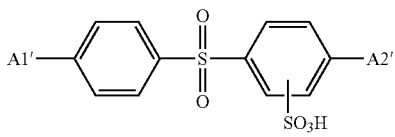

[Chemical Formula 2-3]
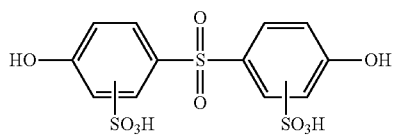

[Chemical Formula 2-4]
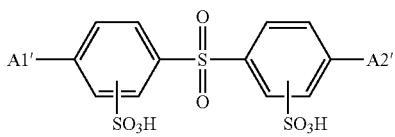

[Chemical Formula 3-1]
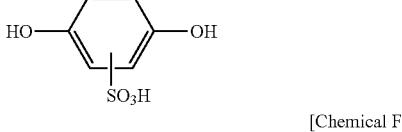

[Chemical Formula 3-2]
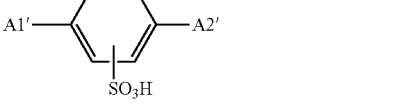

In Chemical Formulae 2-2, 2-4, and 3-2,

A1' and A2' are the same as or different from each other, and are each independently a halogen group.

In an exemplary embodiment of the present specification, the second monomer may be selected from the following structures.

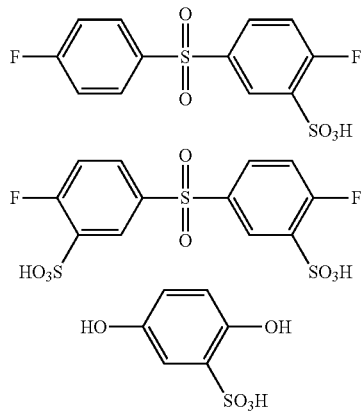

In the present specification, the halogen group is fluorine; chlorine; bromine; or iodine.

In the present specification, the "derived" means that a new bond is generated while the bond of a compound is broken, or a substituent is detached, and a monomer derived from the compound may mean a repeating unit which constitutes a polymer. The monomer may be included in a main chain in a polymer to constitute the polymer.

Specifically, the "derived" means that the monomer is included in a polymer while hydrogen is detached or a halogen group is detached from a substituted hydroxy group (—OH) in Chemical Formula 2 and Chemical Formula 3, and constitutes a repeating unit, that is, a monomer.

In an exemplary embodiment of the present specification, the polymer may further include a brancher. In the present specification, the brancher serves to link or cross-link polymer chains.

In the present specification, in the case of a polymer further including the brancher, the brancher may directly constitute a main chain of the polymer, and may improve a degree of mechanical integrity of a thin film. For example, in a branched polymer of the present invention, a brancher directly constitutes a main chain of a polymer without carrying out a post-sulfonation reaction or a cross-linking reaction of a sulfonated polymer by polymerizing a branched hydrophobic block which does not include acid substituents and a branched hydrophilic block which includes acid substituents, and a hydrophobic block which maintains a degree of mechanical integrity of a thin film and a hydrophilic block which imparts ion conductivity to a thin film may alternately lead to chemical bonds.

In an exemplary embodiment of the present specification, the polymer further includes a brancher derived from a compound of the following Chemical Formula 4 or a brancher represented by the following Chemical Formula 5.

[Chemical Formula 4]

[Chemical Formula 5]

In Chemical Formulae 4 and 5,

X is S; O; CO; SO; SO$_2$; NR; and a hydrocarbon-based or fluorine-based binder, l is an integer from 0 to 100, when l is 2 or more, two or more X's are the same as or different from each other, Y1 and Y2 are the same as or different from each other, and are each independently NRR; an aromatic ring which is once or twice or more substituted with a substituent selected from the group consisting of a hydroxy group and a halogen group; or an aliphatic ring which is once or twice or more substituted with a substituent selected from the group consisting of a hydroxy group and a halogen group, R is an aromatic ring substituted with a halogen group; or an aliphatic ring substituted with a halogen group, and Z is a trivalent organic group.

Examples of the substituents in the present specification will be described below, but are not limited thereto.

In the present specification,

means being bonded to an adjacent substituent or a main chain of a polymer.

In the present specification, a brancher derived from the compound of Chemical Formula 4 may serve as a brancher while in an aromatic ring substituted with a halogen group of each of Y1 and Y2; or an aliphatic ring substituted with a halogen group, the halogen group is detached from the aromatic ring or the aliphatic ring.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, a hydrocarbon-based compound means an organic compound composed only of carbon and hydrogen, and examples thereof include a straight hydrocarbon, a branched hydrocarbon, and a cyclic hydrocarbon, and the like, and are not limited thereto. Further, the hydrocarbon-based compound may include a single bond, a double bond, or a triple bond, and are not limited thereto.

In the present specification, a fluorine-based binder means that a carbon-hydrogen bond is partially or entirely substituted with fluorine in the hydrocarbon-based compound.

In the present specification, the aromatic ring may be an aromatic hydrocarbon ring or an aromatic hetero ring, and may be monocyclic or polycyclic.

Specific examples of the aromatic hydrocarbon ring include a monocyclic aromatic ring, such as a phenyl group, a biphenyl group, and a terphenyl group, and a polycyclic aromatic ring, such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, and a fluoranthene group, and the like, but are not limited thereto.

In the present specification, an aromatic hetero ring means a structure including one or more heteroatoms, for example, O, S, N, Se, and the like instead of a carbon atom in the aromatic hydrocarbon ring. Specific examples thereof include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a qinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzoimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group, and the like, but are not limited thereto.

In the present specification, the aliphatic ring may be an aliphatic hydrocarbon ring or an aliphatic hetero ring, and may be monocyclic or polycyclic. Examples of the aliphatic ring include a cyclopentyl group, a cyclohexyl group, and the like, and are not limited thereto.

In the present specification, examples of the organic group include an alkyl group, an alkenyl group, a cycloalkyl group, a cycloalkenyl group, an aryl group, an aralkyl group, and the like. The organic group may include a bond or a substituent other than a hydrocarbon group such as a heteroatom in the organic group. Further, the organic group may be any one of a straight organic group, a branched organic group, and a cyclic organic group.

In the present specification, the trivalent organic group means a trivalent group having three bonding positions in an organic compound.

Further, the organic group may also form a cyclic structure, and may form a bond by including a heteroatom as long as the effects of the invention are not impaired.

Specifically, examples thereof include a bond including a heteroatom such as an oxygen atom, a nitrogen atom, and a silicon atom. Specific examples thereof include an ether bond, a thioether bond, a carbonyl bond, a thiocarbonyl bond, an ester bond, an amide bond, a urethane bond, an imino bond (—N═C(-A)-, —C(═NA)-: A represents a hydrogen atom or an organic group), a carbonate bond, a sulfonyl bond, a sulfinyl bond, an azo bond, and the like, and are not limited thereto.

The cyclic structure may be the aromatic ring, the aliphatic ring, and the like as described above, and may be monocyclic or polycyclic.

In the present specification, the alkyl group may be straight or branched, and the number of carbon atoms thereof is not particularly limited, but is preferably 1 to 50. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight or branched, and the number of carbon atoms thereof is not particularly limited, but is preferably 2 to 40. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the cycloalkyl group is not limited thereto, but has preferably 3 to 60 carbon atoms, and examples thereof include a cyclopentyl group, a cyclohexyl group, and the like, but are not limited thereto.

In an exemplary embodiment of the present specification, 1 is 3 or more.

In an exemplary embodiment of the present specification, X is S.

In another exemplary embodiment, X is a haloalkyl group.

In another exemplary embodiment of the present specification, X is NR.

In an exemplary embodiment of the present specification, Y1 and Y2 are the same as or different from each other, and are each independently a halogen-substituted aromatic ring.

In an exemplary embodiment of the present specification, Y1 and Y2 are the same as or different from each other, and are each independently a fluorine-substituted aromatic hydrocarbon ring.

In an exemplary embodiment of the present specification, Y1 and Y2 are the same as or different from each other, and are each independently NRR.

In another exemplary embodiment, Y1 and Y2 are each a fluorine-substituted phenyl group. Specific examples thereof include 2,4-phenyl, 2,6-phenyl, 2,3-phenyl, 3,4-phenyl, and the like, and are not limited thereto.

In an exemplary embodiment of the present specification, the compound represented by Chemical Formula 4 may be represented by any one of the following structures.

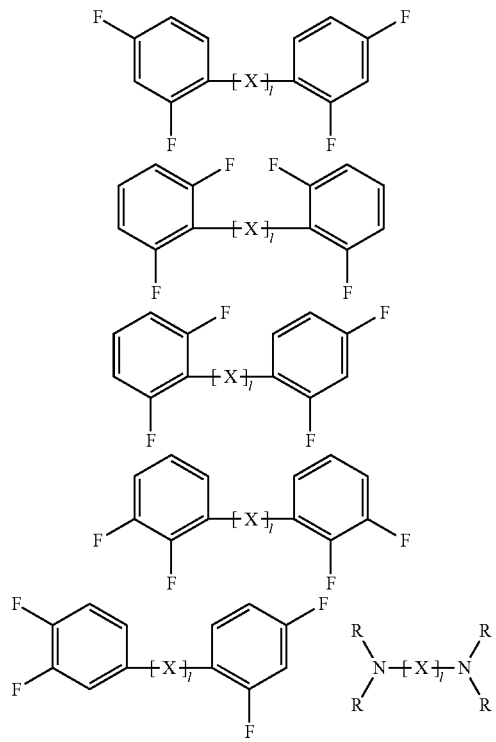
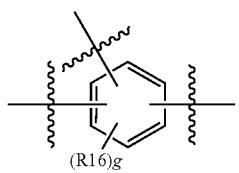

In the structures, X, 1, and R are the same as those defined in Chemical Formula 4.

According to an exemplary embodiment of the present specification, Z in Chemical Formula 5 may be represented by any one of the following Chemical Formulae 5-1 to 5-4.

[Chemical Formula 5-1]

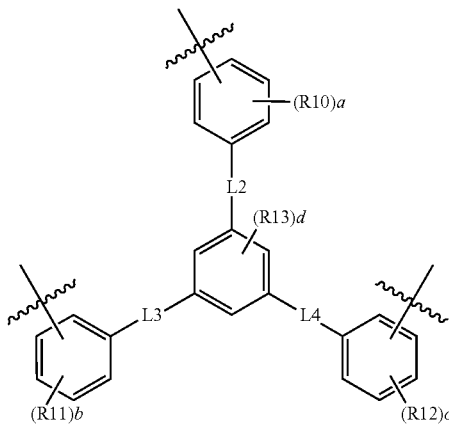

[Chemical Formula 5-2]

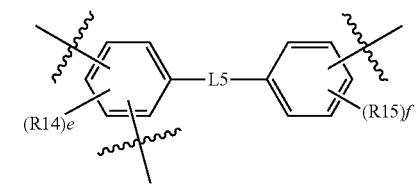

[Chemical Formula 5-3]

[Chemical Formula 5-4]

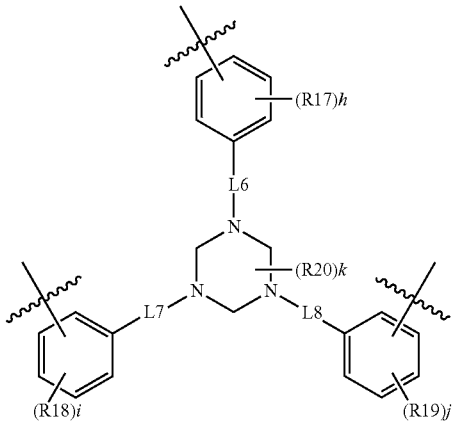

In Chemical Formulae 5-1 to 5-4,

L2 to L8 are the same as or different from each other, and are each independently a direct bond; —S—; —O—; —CO—; or —SO$_2$—, R10 to R20 are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted aryl group; or a substituted or unsubstituted heteroaryl group, a, b, c, f, h, i, and j are each an integer from 1 to 4, d, e, and g are each an integer from 1 to 3, k is an integer from 1 to 6, when a, b, c, d, e, f, g, h, i, j, and k are each an integer of 2 or more, two or more structures in the parenthesis are the same as or different from each other.

In an exemplary embodiment of the present specification, L1 is CO.

In another exemplary embodiment, L1 is $SO_2$.

In still another exemplary embodiment, L1 is S.

In yet another exemplary embodiment, L2 is CO.

In still yet another exemplary embodiment, L2 is $SO_2$.

In a further exemplary embodiment, L2 is S.

In an exemplary embodiment of the present specification, L3 is CO.

In another exemplary embodiment, L3 is $SO_2$.

In still another exemplary embodiment, L3 is S.

In an exemplary embodiment of the present specification, L4 is CO.

In another exemplary embodiment, L4 is $SO_2$.

In an exemplary embodiment of the present specification, L5 is a direct bond.

In another exemplary embodiment, L6 is a direct bond.

In an exemplary embodiment of the present specification, L7 is a direct bond.

In an exemplary embodiment of the present specification, R10 to R20 are hydrogen.

In an exemplary embodiment of the present specification, R16 is a halogen group.

In another exemplary embodiment, R16 is fluorine.

Further, in an exemplary embodiment of the present specification, the brancher represented by Chemical Formula 5 may be represented by any one of the following structures.

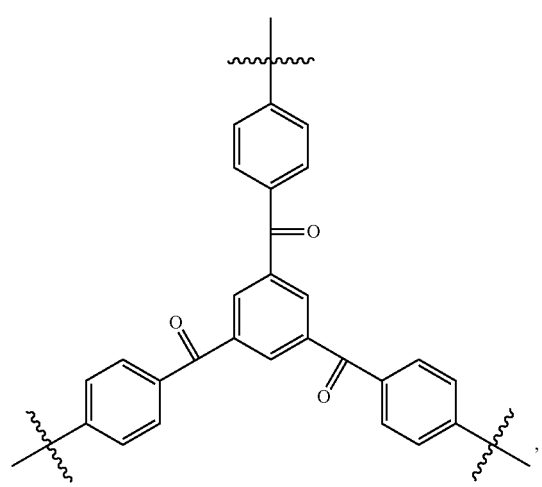

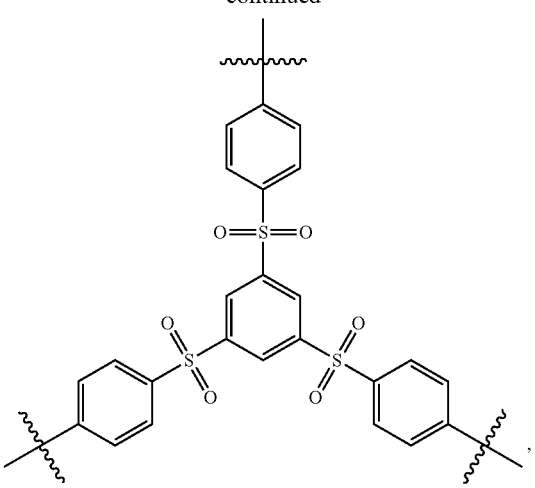

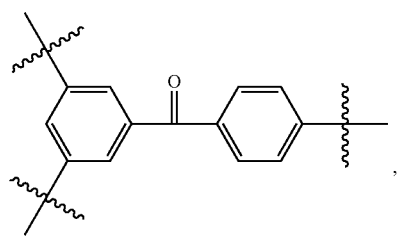

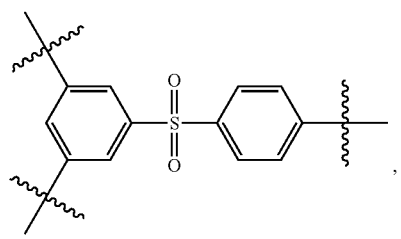

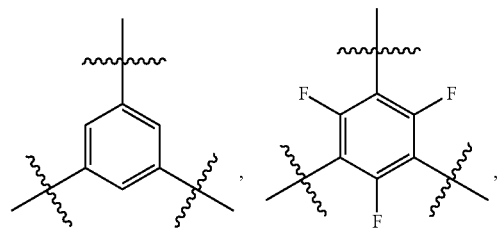

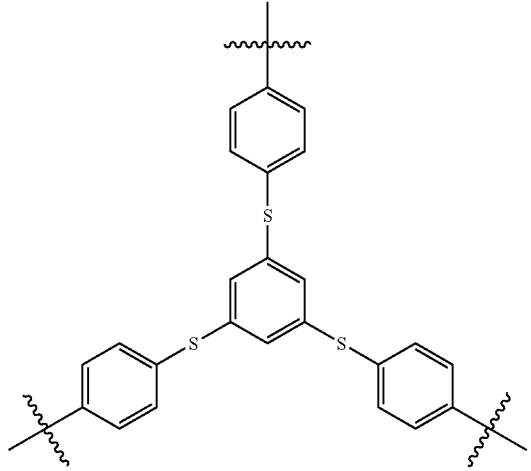

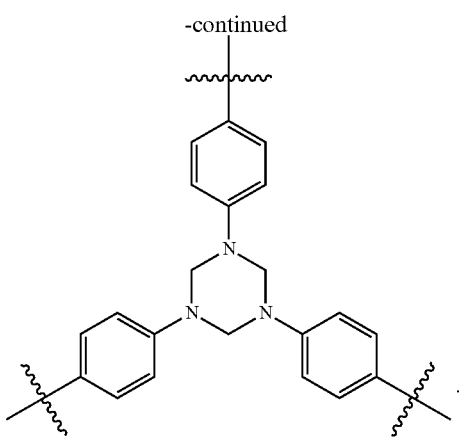

In an exemplary embodiment of the present specification, the polymer has a weight average molecular weight of 500 g/mol to 2,000,000 g/mol. When the polymer has a weight average molecular weight within the range, mechanical properties of an electrolyte membrane including the polymer do not deteriorate, and the electrolyte membrane may be easily manufactured by maintaining an appropriate solubility of the polymer.

In an exemplary embodiment of the present specification, the first monomer represented by Chemical Formula 1; and a second monomer which is different from the first monomer and has at least one sulfonic acid group may constitute a random polymer.

In this case, a polymer including a monomer represented by Chemical Formula 1 may easily form an ion channel because the structure of —[CR1R2]$_n$-A in the chemical formula spreads out in the form of a pendant, so that A functional groups in the polymer are collected to facilitate the phase separation. Accordingly, it is possible to expect an effect in that the ion conductivity of the polymer electrolyte membrane is improved.

In an exemplary embodiment of the present specification, the content of the first monomer represented by Chemical Formula 1 in the polymer is 1 mol % to 99 mol % based on the total content of the polymer, and the content of a second monomer which is different from the first monomer and has at least one sulfonic acid group is 1 mol % to 99 mol % based on the total content of the polymer. In an exemplary embodiment of the present specification, the content of the first monomer represented by Chemical Formula 1 in the polymer is 50 mol % to 99 mol % based on the total content of the polymer, and the content of a second monomer which is different from the first monomer and has at least one sulfonic acid group is 1 mol % to 50 mol % based on the total content of the polymer.

In an exemplary embodiment of the present specification, a polymer including: the first monomer represented by Chemical Formula 1; and a second monomer which is different from the first monomer and has at least one sulfonic acid group is a random polymer.

In another exemplary embodiment of the present specification, the polymer is a block polymer including a hydrophilic block and a hydrophobic block, in which the hydrophilic block includes the first monomer represented by Chemical Formula 1.

In an exemplary embodiment of the present specification, the hydrophilic block includes the first monomer represented by Chemical Formula 1 and a second monomer having at least one sulfonic acid group.

In an exemplary embodiment of the present specification, in the hydrophilic block, the content of the first monomer is 1 mol % to 99 mol % based on the total content of the polymer, and the content of a second monomer which is different from the first monomer and has at least one sulfonic acid group is 1 mol % to 99 mol % based on the total content of the polymer. In an exemplary embodiment of the present specification, in the hydrophilic block, the content of the first monomer represented by Chemical Formula 1 is 50 mol % to 99 mol % based on the total content of the polymer, and the content of a second monomer which is different from the first monomer and has at least one sulfonic acid group is 1 mol % to 50 mol % based on the total content of the polymer.

In an exemplary embodiment of the present specification, the hydrophilic block and the hydrophobic block in the block polymer are included at a molar ratio of 1:0.1 to 1:10. In an exemplary embodiment of the present specification, the hydrophilic block and the hydrophobic block in the block polymer are included at a molar ratio of 1:0.1 to 1:2. In another exemplary embodiment, the hydrophilic block and the hydrophobic block in the block polymer are included at a molar ratio of 1:0.8 to 1:1.2. In this case, the ion transport capability of the block polymer may be increased.

In an exemplary embodiment of the present specification, the monomer represented by Chemical Formula 1 in the hydrophilic block is included in an amount of 0.01 mol % to 100 mol % based on the hydrophilic block.

In one exemplary embodiment of the present specification, the hydrophilic block has a number average molecular weight of 1,000 g/mol to 300,000 g/mol. In a specific exemplary embodiment, the hydrophobic block has a number average molecular weight of 2,000 g/mol to 100,000 g/mol. In another exemplary embodiment, the hydrophobic block has a number average molecular weight of 2,500 g/mol to 50,000 g/mol.

In one exemplary embodiment of the present specification, the hydrophobic block has a number average molecular weight of 1,000 g/mol to 300,000 g/mol. In a specific exemplary embodiment, the hydrophobic block has a number average molecular weight of 2,000 g/mol to 100,000 g/mol. In another exemplary embodiment, the hydrophobic block has a number average molecular weight of 2,500 g/mol to 50,000 g/mol.

According to an exemplary embodiment of the present specification, in the case of a block polymer, the phase separation is facilitated due to the clear division of the fractions of the hydrophilic block and the hydrophobic block, and as a result, the ions may be easily transported. According to an exemplary embodiment of the present specification, when the monomer represented by Chemical Formula 1 is included, the ion transport effect may be better than that of the polymer in the related art because the hydrophilic block and the hydrophobic block are more clearly divided.

The block polymer means a polymer which is configured as one block and one or two or more blocks, which are different from the block, are each linked to a main chain of the polymer.

In an exemplary embodiment of the present specification, the block polymer may include a hydrophilic block and a hydrophobic block. Specifically, in one exemplary embodiment, the block polymer may include a hydrophilic block and a hydrophobic block, which include the monomer represented by Chemical Formula 1.

The "hydrophilic block" of the present specification means a block having an ion exchange group as a functional group. Here, the functional group may be any one selected from the group consisting of —$SO_3H$, —$SO_3^-M^+$, —COOH, —$COO^-M^+$, —$PO_3H_2$, —$PO_3H^-M^+$, and —$PO_3^{2-}2M^+$. Here, M may be a metallic element. That is, the functional group may be hydrophilic.

The "block having an ion exchange group" of the present specification means a block having 0.5 or more ion exchange groups on average when the number of ion exchange groups is represented by the number of ion exchange groups per structural monomer constituting the corresponding block, and is more preferably a block having 1.0 or more ion exchange groups on average per structural monomer.

"A hydrophobic block" of the present specification means a polymer block substantially having no ion exchange group.

The "block substantially having no ion exchange group" of the present specification means a block having less than 0.01 ion exchange groups on average when the number of ion exchange groups is represented by the number of the ion exchange groups per structural monomer constituting the corresponding block, and is more preferably a block having 0.05 or less ion exchange groups on average, and even more preferably a block having no ion exchange group.

Further, the present specification provides a polymer electrolyte membrane including the above-described polymer.

When the polymer electrolyte membrane includes a polymer including a monomer derived from the compound according to an exemplary embodiment of the present specification, the polymer electrolyte membrane may have high mechanical strength and high ion conductivity, and may facilitate the phase separation phenomenon of the electrolyte membrane.

In the present specification, the "electrolyte membrane" is a membrane which may exchange ions, and includes a membrane, an ion exchange membrane, an ion transport membrane, an ion conductive membrane, a separation membrane, an ion exchange separation membrane, an ion transport separation membrane, an ion conductive separation membrane, an ion exchange electrolyte membrane, an ion transport electrolyte membrane, or an ion conductive electrolyte membrane, and the like.

The polymer electrolyte membrane according to an exemplary embodiment of the present specification may be manufactured by using materials and/or methods known in the art, except that the polymer electrolyte membrane includes a polymer including a monomer derived from the compound.

According to an exemplary embodiment of the present specification, the polymer electrolyte membrane has ion conductivity of 0.01 S/cm or more and 0.5 S/cm or less. In another exemplary embodiment, the polymer electrolyte membrane has ion conductivity of 0.01 S/cm or more and 0.3 S/cm or less.

In an exemplary embodiment of the present specification, the ion conductivity of the polymer electrolyte membrane may be measured under humidified conditions. The humidified conditions in the present specification may mean a relative humidity (RH) of 10% to 100%.

Further, in an exemplary embodiment of the present specification, the polymer electrolyte membrane has an ion exchange capacity (IEC) value of 0.01 mmol/g to 5.0 mmol/g. When the polymer electrolyte membrane has the ion exchange capacity (IEC) value within the range, ion channels are formed in the polymer electrolyte membrane, and the polymer may exhibit ion conductivity.

In an exemplary embodiment of the present specification, the polymer electrolyte membrane has a thickness of 1 μm to 500 μm. The polymer electrolyte membrane having a thickness within the range may reduce the electric short and the crossover of the electrolyte material, and may exhibit excellent cation conductivity characteristics.

An exemplary embodiment of the present specification provides a reinforced membrane including: a substrate; and the above-described polymer.

In an exemplary embodiment of the present specification, the 'reinforced membrane' is an electrolyte membrane including a substrate, which is a reinforced material, and may mean a membrane including a substrate, an ion exchange membrane, an ion transport membrane, an ion conductive membrane, a separation membrane, an ion exchange separation membrane, an ion transport separation membrane, an ion conductive separation membrane, an ion exchange electrolyte membrane, an ion transport electrolyte membrane, or an ion conductive electrolyte membrane, and the like, as a membrane capable of exchanging ions.

In the present specification, the substrate may mean a support having a 3-D network structure, and a reinforced membrane including the substrate and the polymer may mean that the polymer is included in at least a portion of one surface of the substrate, a surface facing the one surface, and a pore region in the substrate. That is, the reinforced membrane of the present specification may be provided in a form in which the polymer is impregnated in the substrate.

The polymer is the same as the contents as described above.

In the case of a hydrocarbon-based ion transport separation membrane, there is a problem in that the ion transport capability deteriorates as compared to a fluorine-based separation membrane, and the chemical resistance is weak. Accordingly, the reinforced membrane according to an exemplary embodiment of the present specification includes a polymer including the unit represented by Chemical Formula 1, and thus has high mechanical strength and high ion conductivity, and may facilitate the phase separation phenomenon of the reinforced membrane.

Further, the reinforced membrane according to an exemplary embodiment of the present specification includes a substrate, and thus enhances chemical resistance and durability, thereby improving the service life of the device.

In an exemplary embodiment of the present specification, as the substrate, one or two is or are selected from the group consisting of polypropylene (PP), polytetrafluoroethylene (PTFE), polyethylene (PE), and polyvinylidene difluoride (PVDF).

In an exemplary embodiment of the present specification, the content of the polymer is 10 parts by weight to 99 parts by weight based on 100 parts by weight of the reinforced membrane.

In another exemplary embodiment, based on 100 parts by weight of the reinforced membrane, the content of the polymer is 10 parts by weight to 99 parts by weight, and the content of the substrate is 1 part by weight to 90 parts by weight. As the content of the substrate is increased, the crossover of vanadium ions may be decreased, and as the content of the polymer is increased, the performance of the battery may be improved.

Accordingly, when the contents of the substrate and the polymer according to an exemplary embodiment of the present specification are within the range, the performance of the battery may be maintained, and simultaneously, the crossover of vanadium ions may be decreased.

According to an exemplary embodiment of the present specification, the reinforced membrane has ion conductivity of 0.001 S/cm or more and 0.5 S/cm or less. In another exemplary embodiment, the reinforced membrane has ion conductivity of 0.001 S/cm or more and 0.3 S/cm or less.

In the present specification, the ion conductivity may be measured under the same conditions as the above-described method.

Further, in an exemplary embodiment of the present specification, the reinforced membrane has an ion exchange capacity (IEC) value of 0.01 mmol/g to 5.0 mmol/g. When the reinforced membrane has the ion exchange capacity (IEC) value within the range, ion channels are formed in the reinforced membrane, and the polymer may exhibit ion conductivity.

In an exemplary embodiment of the present specification, the reinforced membrane has a thickness of 0.01 µm to 10,000 µm. The reinforced membrane having a thickness within the range may reduce the electric short and the crossover of the electrolyte material, and may exhibit excellent cation conductivity characteristics.

The present specification also provides a method for manufacturing a reinforced membrane, the method including: preparing a substrate; and impregnating the substrate in a polymer including the unit represented by Chemical Formula 1.

In the present specification, the impregnation means that a polymer permeates into a substrate. In the present specification, the impregnation may be carried out by using dipping of the substrate in the polymer, a slot dye coating, a bar casting, and the like.

In the present specification, the dipping may be expressed as a term such as dip coating or a dipping method.

In an exemplary embodiment of the present specification, the reinforced membrane may have an orientation. Specifically, in an exemplary embodiment of the present specification, the substrate may be manufactured through uniaxial stretching or biaxial stretching, and the orientation of a substrate by the stretching may determine the orientation of the reinforced membrane. Therefore, the reinforced membrane according to an exemplary embodiment of the present specification may have an orientation of a machine direction (MD) and a direction perpendicular to the machine direction (MD), and the reinforced membrane may exhibit the difference in physical properties such as stress and elongation according to the orientation.

The present specification also provides a method for manufacturing a reinforced membrane, the method including: preparing a substrate; and dipping the substrate in the polymer.

In the present specification, the substrate and the polymer are the same as those as described above.

The present specification also provides a membrane-electrode assembly including: an anode; a cathode; and the above-described polymer electrolyte membrane disposed between the anode and the cathode.

The present specification also provides a membrane-electrode assembly including: an anode; a cathode; and the above-described reinforced membrane disposed between the anode and the cathode.

The membrane-electrode assembly (MEA) means an assembly of electrodes (a cathode and an anode) in which an electrochemical catalyst reaction of fuel and air occurs and a polymer membrane in which hydrogen ions are transported, and is a single integral-type unit in which electrodes (a cathode and an anode) and an electrolyte membrane are adhered.

The membrane-electrode assembly of the present specification is in the form in which a catalyst layer of an anode and a catalyst layer of a cathode are brought into contact with an electrolyte membrane, and may be manufactured by a typical method known in the art. As an example, the membrane-electrode assembly may be manufactured by thermally compressing, at 100° C. to 400° C., the cathode; the anode; and the electrolyte membrane positioned between the cathode and the anode in a state in which the cathode, the anode, and the electrolyte membrane are brought into close contact with each other.

An anode electrode may include an anode catalyst layer and an anode gas diffusion layer. The anode gas diffusion layer may include an anode micro porous layer and an anode electrode substrate.

A cathode electrode may include a cathode catalyst layer and a cathode gas diffusion layer. The cathode gas diffusion layer may include a cathode micro porous layer and a cathode electrode substrate.

FIG. 1 schematically illustrates the electricity generation principle of a fuel cell, and in the fuel cell, the most fundamental unit of generating electricity is a membrane-electrode assembly (MEA), and the membrane-electrode assembly is composed of an electrolyte membrane 100 and electrodes of an anode 200a and a cathode 200b formed on both surfaces of the electrolyte membrane 100. Referring to FIG. 1 which illustrates the elasticity generation principle of a fuel cell, an oxidation reaction of a fuel such as hydrogen or a hydrocarbon such as methanol and butane occurs in the anode 200a, and as a result, hydrogen ions ($H^+$) and electrons ($e^-$) are generated, and the hydrogen ions move to the cathode 200b through the electrolyte membrane 100. In the cathode 200b, hydrogen ions transported through the electrolyte membrane 100, an oxidizing agent such as oxygen, and electrons are reacted to produce water. Electrons move to an external circuit by the reaction.

The catalyst layer of the anode electrode is a site where an oxidation reaction of fuel occurs, and it is possible to preferably use a catalyst selected from the group consisting of platinum, ruthenium, osmium, a platinum-ruthenium alloy, a platinum-osmium alloy, a platinum-palladium alloy, and a platinum-transition metal alloy. The catalyst layer of the cathode electrode is a site where a reduction reaction of an oxidizing agent occurs, and platinum or a platinum-transition metal alloy may be preferably used as a catalyst. The catalysts may be not only used as they are, but also used while being supported on a carbon-based carrier.

The process of introducing a catalyst layer may be carried out by a typical method known in the art, and for example, a catalyst layer may be formed by directly coating an electrolyte membrane with a catalyst ink or coating a gas diffusion layer with a catalyst ink. In this case, the method of coating a catalyst ink is not particularly limited, but it is possible to use a method such as spray coating, tape casting, screen printing, blade coating, die coating or spin coating, and the like. The catalyst ink may be representatively composed of a catalyst, a polymer ionomer, and a solvent.

The gas diffusion layer serves as both a current conductor and a channel through which reaction gasses and water move, and has a porous structure. Accordingly, the gas diffusion layer may include a conductive substrate. As the conductive substrate, carbon paper, carbon cloth, or carbon felt may be preferably used. The gas diffusion layer may further include a micro porous layer between the catalyst layer and the conductive substrate. The micro porous layer may be used in order to improve the performance of a fuel cell under low humidified conditions, and serves to allow an electrolyte membrane to be maintained in a sufficiently wet state by reducing the amount of water leaving out of the gas diffusion layer.

An exemplary embodiment of the present specification provides a polymer electrolyte-type fuel cell including: two or more membrane-electrode assemblies; a stack which includes a bipolar plate disposed between the membrane-electrode assemblies; a fuel supplying part which supplies fuel to the stack; and an oxidizing agent supplying part which supplies an oxidizing agent to the stack.

In the present specification, the membrane-electrode assembly includes the above-described polymer electrolyte membrane, or includes a reinforced membrane.

A fuel cell is an energy conversion device that converts chemical energy of a fuel directly into electrical energy. That is, the fuel cell uses a fuel gas and an oxidizing agent, and adopts a method of producing electric power by using electrons generated during the redox reaction of the fuel gas and the oxidizing agent.

The fuel cell may be manufactured by a typical method known in the art by using the above-described membrane-electrode assembly (MEA). For example, the fuel cell may be manufactured by being composed of the membrane-electrode assembly manufactured above and the bipolar plate.

The fuel cell of the present specification includes a stack, a fuel supplying part, and an oxidizing agent supplying part.

FIG. 3 schematically illustrates the structure of a fuel cell, and the fuel cell includes a stack 60, an oxidizing agent supplying part 70, and a fuel supplying part 80.

The stack 60 includes the aforementioned one or two or more membrane-electrode assemblies, and when two or more membrane-electrode assemblies are included, the stack 60 includes a separator interposed therebetween. The separator serves to prevent the membrane-electrode assemblies from being electrically connected to each other, and to transport fuel and an oxidizing agent supplied from the outside to the membrane-electrode assemblies.

The oxidizing agent supplying part 70 serves to supply an oxidizing agent to the stack 60. As the oxidizing agent, oxygen is representatively used, and oxygen or air may be used by being injected by means of a pump 70.

The fuel supplying part 80 serves to supply fuel to the stack 60, and may be composed of a fuel tank 81 which stores fuel and a pump 82 which supplies fuel stored in the fuel tank 81 to the stack 60. As the fuel, hydrogen or hydrocarbon fuel in a gas or liquid state may be used. Examples of the hydrocarbon fuel include methanol, ethanol, propanol, butanol, or natural gases.

The fuel cell can be a polymer electrolyte fuel cell, a direct liquid fuel cell, a direct methanol fuel cell, a direct formic acid fuel cell, a direct ethanol fuel cell, or a direct dimethyl ether fuel cell, and the like.

When the electrolyte membrane according to an exemplary embodiment of the present specification is used as an ion exchange membrane of a fuel cell, the above-described effect may be exhibited.

Further, an exemplary embodiment of the present specification provides a redox flow battery including: a positive electrode cell including a positive electrode and a positive electrode electrolytic solution; a negative electrode cell including a negative electrode and a negative electrode electrolytic solution; and the polymer electrolyte membrane according to an exemplary embodiment of the present specification, which is disposed between the positive electrode cell and the negative electrode cell.

Another exemplary embodiment provides a redox flow battery including: a positive electrode cell including a positive electrode and a positive electrode electrolytic solution; a negative electrode cell including a negative electrode and a negative electrode electrolytic solution; and the reinforced membrane according to an exemplary embodiment of the present specification, which is disposed between the positive electrode cell and the negative electrode cell.

A redox flow battery (oxidation-reduction flow battery) is an electrochemical power storage device that stores chemical energy of an active material directly into electrical energy by using a system in which the active material included in an electrolytic solution is oxidized and reduced and thus the battery is charged and discharged. The redox flow battery uses a principle in which when electrolytic solutions including active materials having different oxidation states meet each other with an ion exchange membrane interposed therebetween, electrons are given and received, and thus the battery is charged and discharged. In general, the redox flow battery is composed of a tank which contains an electrolytic solution, a battery cell in which the charge and discharge occur, and a circulation pump which circulates the electrolytic solution between the tank and the battery cell, and the unit cell of the battery cell includes an electrode, an electrolyte, and an ion exchange membrane.

When the electrolyte membrane according to an exemplary embodiment of the present specification is used as an ion exchange membrane of a redox flow battery, the above-described effect may be exhibited.

The redox flow battery of the present specification may be manufactured by a typical method known in the art, except that the redox flow battery includes the polymer electrolyte membrane according to an exemplary embodiment of the present specification.

As illustrated in FIG. 2, the redox flow battery is divided into a positive electrode cell 32 and a negative electrode cell 33 by an electrolyte membrane 31. The positive electrode cell 32 and the negative electrode cell 33 include a positive electrode and a negative electrode, respectively. The positive electrode cell 32 is connected to a positive electrode tank 10 for supplying and releasing a positive electrode electrolytic solution 41 through pipes. The negative electrode cell 33 is also connected to a negative electrode tank 20 for supplying and releasing a negative electrode electrolytic solution 42 through pipes. The electrolytic solution is circulated through pumps 11 and 21, and an oxidation/reduction reaction (that is, a redox reaction) in which the oxidation number of ions is changed occurs, and as a result, the charge and discharge occur in the positive electrode and the negative electrode.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples described below in detail. The Examples of the present specification are provided to more completely explain the present specification to a person with ordinary skill in the art.

EXAMPLE 1

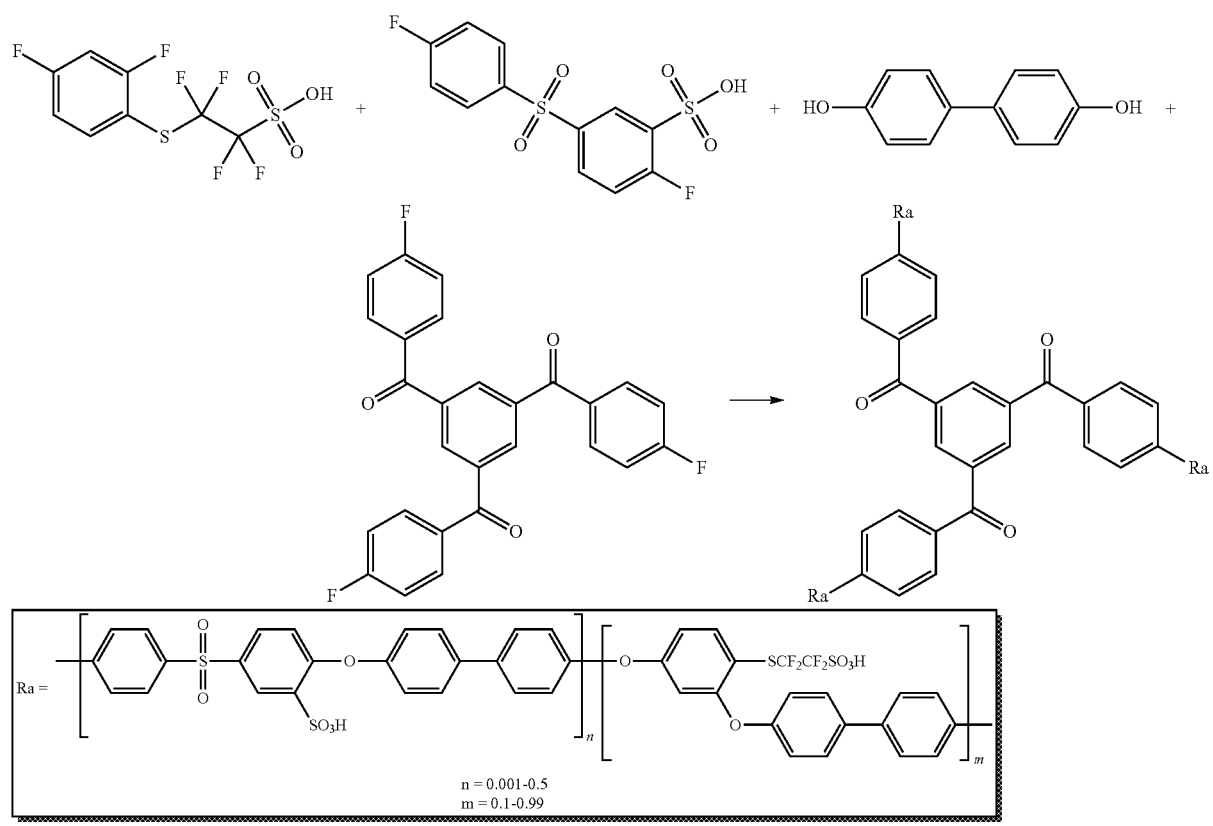

Potassium carbonate (K$_2$CO$_3$)(5.5 g) and bisphenol (1.86 g) were put into 2-((2,4-difluorophenyl)thio)-1,1,2,2-tetrafluoroethane-1-sulfonic acid (3 g) and 2-fluoro-5-((4-fluorophenyl) sulfonyl)benzenesulfonic acid (0.5 g), N-methylpyrrolidone (NMP) and benzene were put thereinto, and the resulting mixture was stirred at 140° C. for 4 hours. Thereafter, the temperature was increased to 180° C., and a reaction was carried out for 24 hours to obtain a polymer.

COMPARATIVE EXAMPLE 1

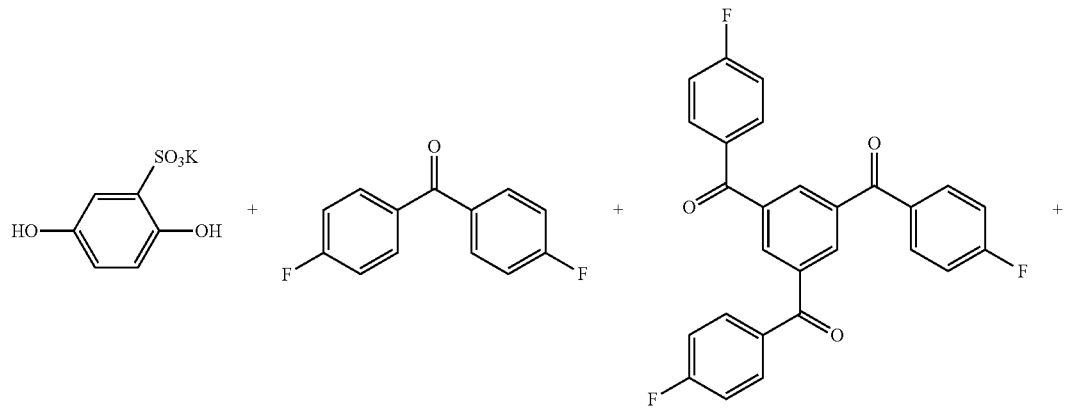

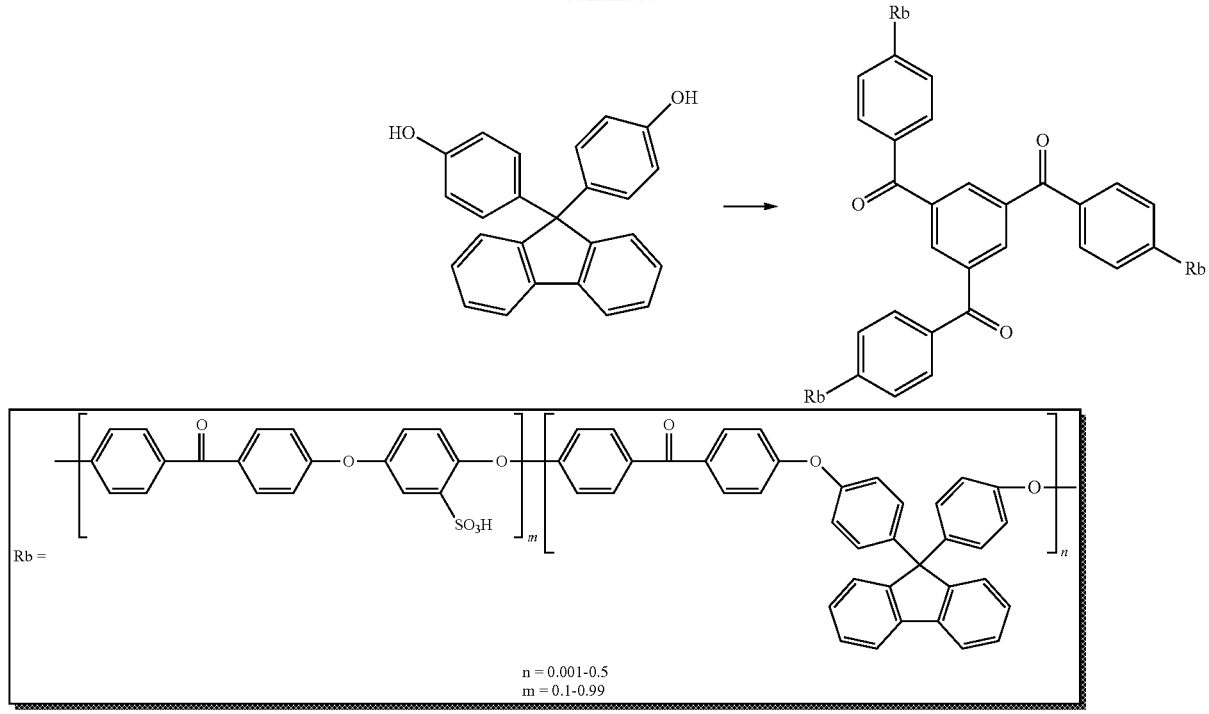

A polymer in Comparative Example 1 was synthesized in the same manner as in the Preparation Example, except that the aforementioned monomer was used instead of the monomer used in the Preparation Example.

The results of measuring the ion conductivities of the polymer manufactured in Example 1 and Comparative Example 1 are shown in Table 1.

TABLE 1

|  | Comparative Example 1 | Example 1 |
| --- | --- | --- |
| Ion conductivity (S/cm) | 0.04 | 0.11 |

As a result of Table 1, it can be confirmed that the polymer including both the first monomer and the second monomer has high ion conductivity.

COMPARATIVE EXAMPLE 2

As a result of carrying out an experiment of obtaining a polymer by using a 2,4-difluoro partial fluorine-based monomer, which is a first monomer represented by Chemical Formula 1-1 in Example 1, it was successful in obtaining a polymer having a high molecular weight. However, it was attempted to prepare a polymer by using a 2,5-difluoro partial fluorine-based monomer generally used, but it failed to obtain a polymer having a high molecular weight under the same conditions. The molecular weight of the polymer was measured by gel permeation chromatography (GPC), and is shown in the following Table 2.

COMPARATIVE EXAMPLE 3

It was attempted to prepare a polymer by using a monomer, which is $SO_2$, instead of the $-[CR1R2]_n-A$ structure and an S atom as a linker of the benzene ring in Chemical Formula 1 in the same manner as in Comparative Example 1, but it failed to obtain a polymer having a high molecular weight under the same conditions. The molecular weight of the polymer was measured by gel permeation chromatography (GPC), and is shown in the following Table 2.

TABLE 2

| Partial fluorine-based membrane | Mn (g/mol) | Mw (g/mol) | Mw/Mn |
| --- | --- | --- | --- |
| Example 1 | 84,000 | 622,000 | 7.40 |
| Comparative Example 2 | N/A | N/A | N/A |
| Comparative Example 3 | N/A | N/A | N/A |

In Table 2, N/A means not available, and it can be confirmed that the polymer was not formed.

As a result of Example 1 and Comparative Example 2, the monomer with the functional groups substituted at 2 and 5 positions, which is generally used in the art, has been commercially used without considering reactivity in spite of a big difference in reactivity during the polymerization reaction according to the properties of the functional group substituted at the other positions.

In a 2,4-difluoro halogenated compound according to an exemplary embodiment of the present specification, it can be confirmed that the functional group of Chemical Formula 2 hung as a pendant exhibit properties of an electron withdrawer as a whole, and accordingly, reactivity during the polymerization reaction is greatly improved, and as a result, the compound has an advantage in obtaining a polymer having a high molecular weight.

From the results of Example 1 and Comparative Example 3, it can be confirmed that a compound including the monomer represented by Chemical Formula 1 according to an exemplary embodiment of the present specification is chemically stable, and thus easily forms the polymer.

The invention claimed is:

1. A polymer comprising:

a first monomer represented by the following Chemical Formula 1; and a second monomer which is different from the first monomer and has at least one sulfonic acid group:

[Chemical Formula 1]

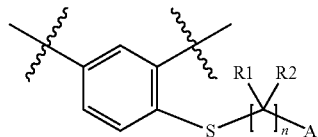

in Chemical Formula 1,

A is —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$, or —$O(CF_2)_mPO_3^{2-}2M^+$, m is an integer from 1 to 6, M is a Group 1 element, R1 and R2 are the same as or different from each other, and are each independently a halogen group, n is an integer from 1 to 10, and when m and n are 2 or more, two or more structures in the parenthesis are the same as or different from each other.

2. The polymer of claim 1, wherein the first monomer represented by Chemical Formula 1 is represented by any one of the following Chemical Formulae 1-1 to 1-9:

[Chemical Formula 1-1]

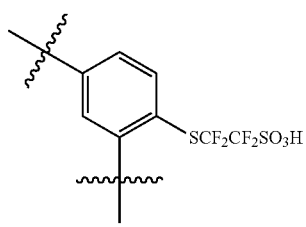

[Chemical Formula 1-2]

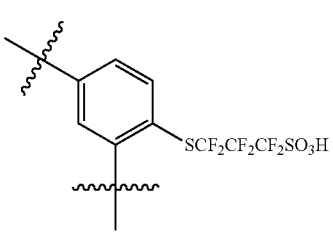

[Chemical Formula 1-3]

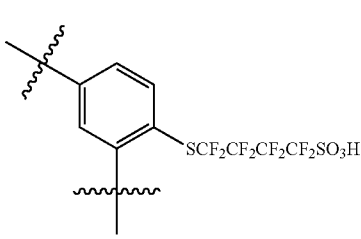

[Chemical Formula 1-4]

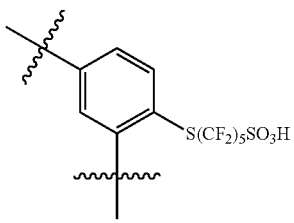

[Chemical Formula 1-5]

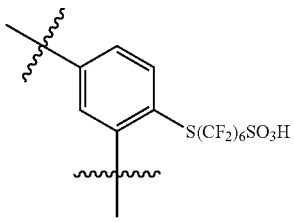

[Chemical Formula 1-6]

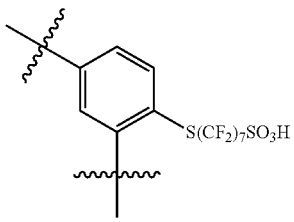

[Chemical Formula 1-7]

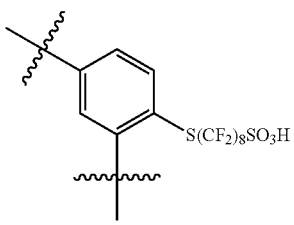

[Chemical Formula 1-8]

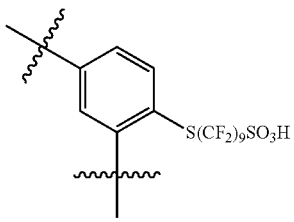

[Chemical Formula 1-9]

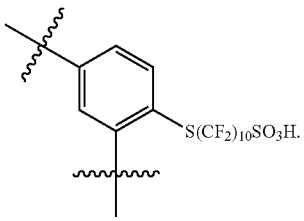

3. The polymer of claim 1, wherein the second monomer is derived from a compound represented by the following Chemical Formula 2 or Chemical Formula 3:

[Chemical Formula 2]

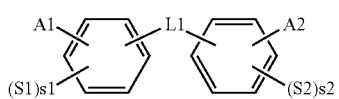

-continued

[Chemical Formula 3]

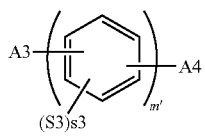

in Chemical Formulae 2 and 3,
A1 to A4 are the same as or different from each other, and are each independently a hydroxy group; or a halogen group,
L1 is a direct bond; CR3R4; C=O; O; S; SO$_2$; SiR5R6; or a substituted or unsubstituted fluorenylene group,
R3 to R6 are the same as or different from each other, and are each independently hydrogen; an alkyl group; fluorine; a haloalkyl group; or a phenyl group,
S1 to S3 are the same as or different from each other, and are each independently hydrogen; deuterium; a halogen group; a cyano group; a nitrile group; a nitro group; a hydroxy group; a haloalkyl group; a sulfonic acid group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; or a substituted or unsubstituted heterocyclic group,
s1, s2, and s3 are each an integer from 1 to 4,
m' is an integer from 1 to 5,
when s1, s2, s3, and m' are each an integer of 2 or more, two or more structures in the parenthesis are the same as or different from each other, and
Chemical Formula 2 and Chemical Formula 3 are substituted with at least one sulfonic acid group.

4. The polymer of claim 1, wherein the second monomer is derived from a compound represented by any one of the following Chemical Formulae 2-1 to 2-4, 3-1, and 3-2:

[Chemical Formula 2-1]

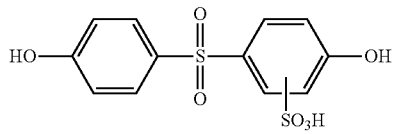

[Chemical Formula 2-2]

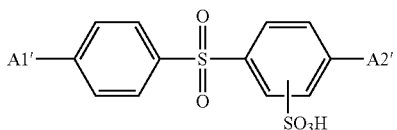

[Chemical Formula 2-3]

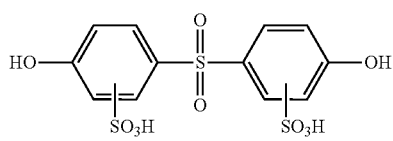

[Chemical Formula 2-4]

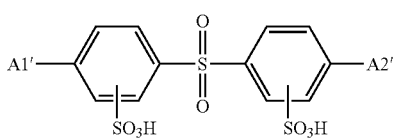

[Chemical Formula 3-1]

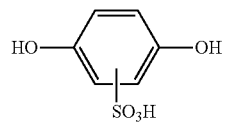

[Chemical Formula 3-2]

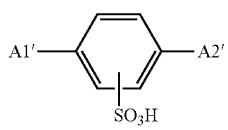

in Chemical Formulae 2-2, 2-4, and 3-2,
A1' and A2' are the same as or different from each other, and are each independently a halogen group.

5. The polymer of claim 1, wherein the polymer comprises a brancher derived from a compound represented by the following Chemical Formula 4 or a brancher represented by the following Chemical Formula 5:

[Chemical Formula 4]

[Chemical Formula 5]

in Chemical Formulae 4 and 5,
X is S; O; CO; SO; SO$_2$; NR; and a hydrocarbon-based or fluorine-based binder,
1 is an integer from 0 to 100,
when 1 is 2 or more, two or more X's are the same as or different from each other,
Y1 and Y2 are the same as or different from each other, and are each independently NRR; an aromatic ring which is once or twice or more substituted with a substituent selected from the group consisting of a hydroxy group and a halogen group; or an aliphatic ring which is once or twice or more substituted with a substituent selected from the group consisting of a hydroxy group and a halogen group,
R is an aromatic ring substituted with a halogen group; or an aliphatic ring substituted with a halogen group, and
Z is a trivalent organic group.

6. The polymer of claim 5, wherein the brancher represented by Chemical Formula 5 is any one of the following structures:

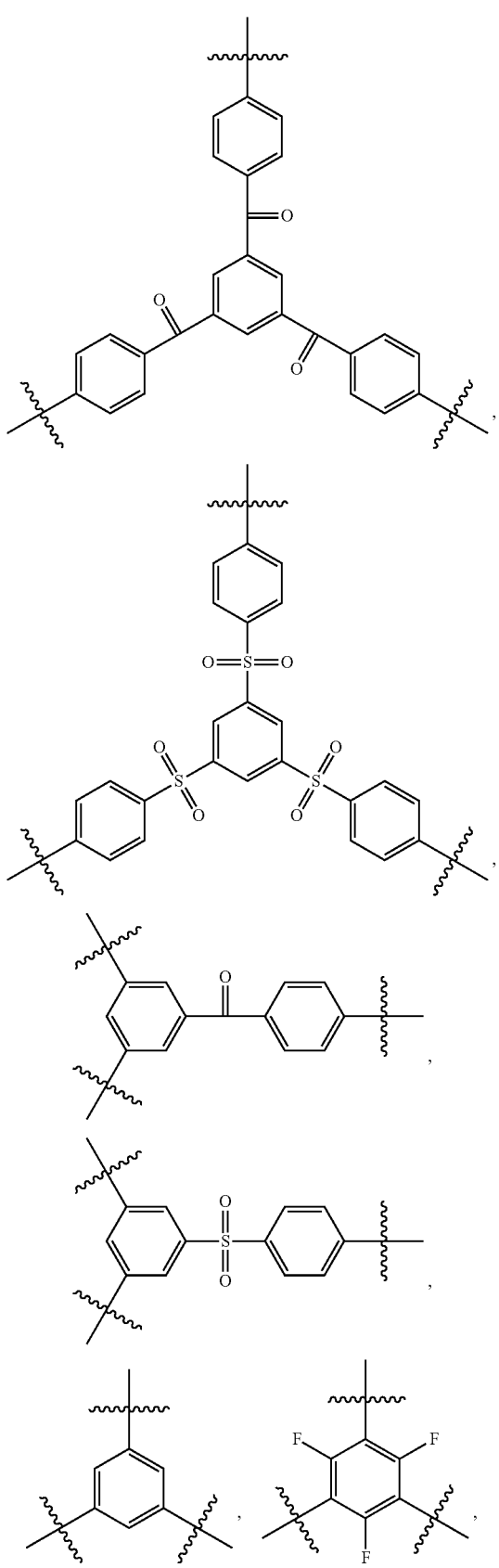 [SMILES: *c1ccc(C(=O)c2cc(C(=O)c3ccc(*)cc3)cc(C(=O)c3ccc(*)cc3)c2)cc1 ; *c1ccc(S(=O)(=O)c2cc(S(=O)(=O)c3ccc(*)cc3)cc(S(=O)(=O)c3ccc(*)cc3)c2)cc1 ; *c1ccc(C(=O)c2cc(*)cc(*)c2)cc1 ; *c1ccc(S(=O)(=O)c2cc(*)cc(*)c2)cc1 ; *c1cc(*)cc(*)c1 ; *c1c(F)c(*)c(F)c(*)c1F]

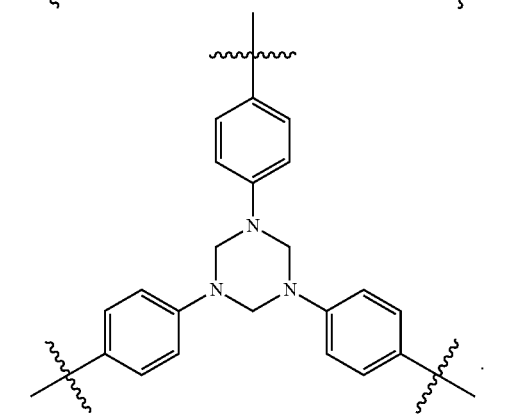

7. The polymer of claim 1, wherein the polymer has a weight average molecular weight of 500 g/mol to 2,000,000 g/mol.

8. The polymer of claim 1, wherein the polymer is a random polymer.

9. The polymer of claim 1, wherein the polymer comprises a hydrophilic block and a hydrophobic block, and
the hydrophilic block is a block polymer comprising the first monomer represented by Chemical Formula 1.

10. The polymer of claim 9, wherein the hydrophilic block and the hydrophobic block in the block polymer are comprised at a molar ratio of 1:0.1 to 1:10.

11. A polymer electrolyte membrane comprising the polymer according to claim 1.

12. A reinforced membrane comprising:
a substrate; and
the polymer according to claim 1.

13. The polymer electrolyte membrane of claim 11, wherein the polymer electrolyte membrane has ion conductivity of 0.01 S/cm to 0.5 S/cm.

14. The polymer electrolyte membrane of claim 11, wherein the polymer electrolyte membrane has an ion exchange capacity (IEC) value of 0.01 mmol/g to 5 mmol/g.

15. A membrane-electrode assembly comprising:
an anode;
a cathode; and
the polymer electrolyte membrane of claim 11 disposed between the anode and the cathode.

16. A polymer electrolyte-type fuel cell comprising:
the two or more membrane-electrode assemblies according to claim 15;

a stack which comprises a bipolar plate disposed between the membrane-electrode assemblies;
a fuel supplying part which supplies fuel to the stack; and
an oxidizing agent supplying part which supplies an oxidizing agent to the stack.

17. A redox flow battery comprising:
a positive electrode cell comprising a positive electrode and a positive electrode electrolytic solution;
a negative electrode cell comprising a negative electrode and a negative electrode electrolytic solution; and
the polymer electrolyte membrane of claim 11 disposed between the positive electrode cell and the negative electrode cell.

18. A membrane-electrode assembly comprising:
an anode;
a cathode; and
the reinforced membrane of claim 12 disposed between the anode and the cathode.

19. A polymer electrolyte-type fuel cell comprising:
the two or more membrane-electrode assemblies according to claim 18;
a stack which comprises a bipolar plate disposed between the membrane-electrode assemblies;
a fuel supplying part which supplies fuel to the stack; and
an oxidizing agent supplying part which supplies an oxidizing agent to the stack.

20. A redox flow battery comprising:
a positive electrode cell comprising a positive electrode and a positive electrode electrolytic solution;
a negative electrode cell comprising a negative electrode and a negative electrode electrolytic solution; and
the reinforced membrane of claim 12 disposed between the positive electrode cell and the negative electrode cell.

* * * * *